United States Patent

[11] 3,545,732

[72] Inventors Gerard Deynat
8 Quai St. Cosme, Chalon-Sur-Saone-et-Loure, and
Jean Pierre Lippmann, 2 rue Aubriet, Vaucresson, Hauts-de-Seine, France
[21] Appl. No. 759,986
[22] Filed Sept. 16, 1968
[45] Patented Dec. 8, 1970
[32] Priority Feb. 7, 1968
[33] France
[31] No. 138951

[54] INSTALLATION FOR PREHEATING POWDERY MATERIALS BY THE EXHAUST GASES OF THE FURNACE FOR TREATING THESE MATERIALS
2 Claims, 1 Drawing Fig.
[52] U.S. Cl. .................................................. 263/21, 263/32
[51] Int. Cl. ................................................... F27b 3/00
[50] Field of Search .......................................... 263/32, 21; 34/53

[56] References Cited
UNITED STATES PATENTS

| | | | |
|---|---|---|---|
| 2,663,561 | 12/1953 | Muller............................ | 263/32 |
| 3,135,588 | 6/1964 | Helming......................... | 34/57 |
| 3,207,494 | 9/1965 | Jager.............................. | 263/32X |
| 3,317,201 | 5/1967 | Muller et al. ................. | 263/32 |

Primary Examiner—Edward G. Favors
Attorney—Cameron, Kerkan and Sutton

ABSTRACT: An installation for preheating pulverulent material by counterflow through a plurality of heaters in series with exhaust gas, a separator downstream of each heater, a general blower downstream of the heaters in relation to the exhaust gas and a blower having a two-way delivery duct to reintroduce gases from downstream of the last heater to either a point downstream of the first heater relative to the exhaust gas, or a point downstream of the general blower.

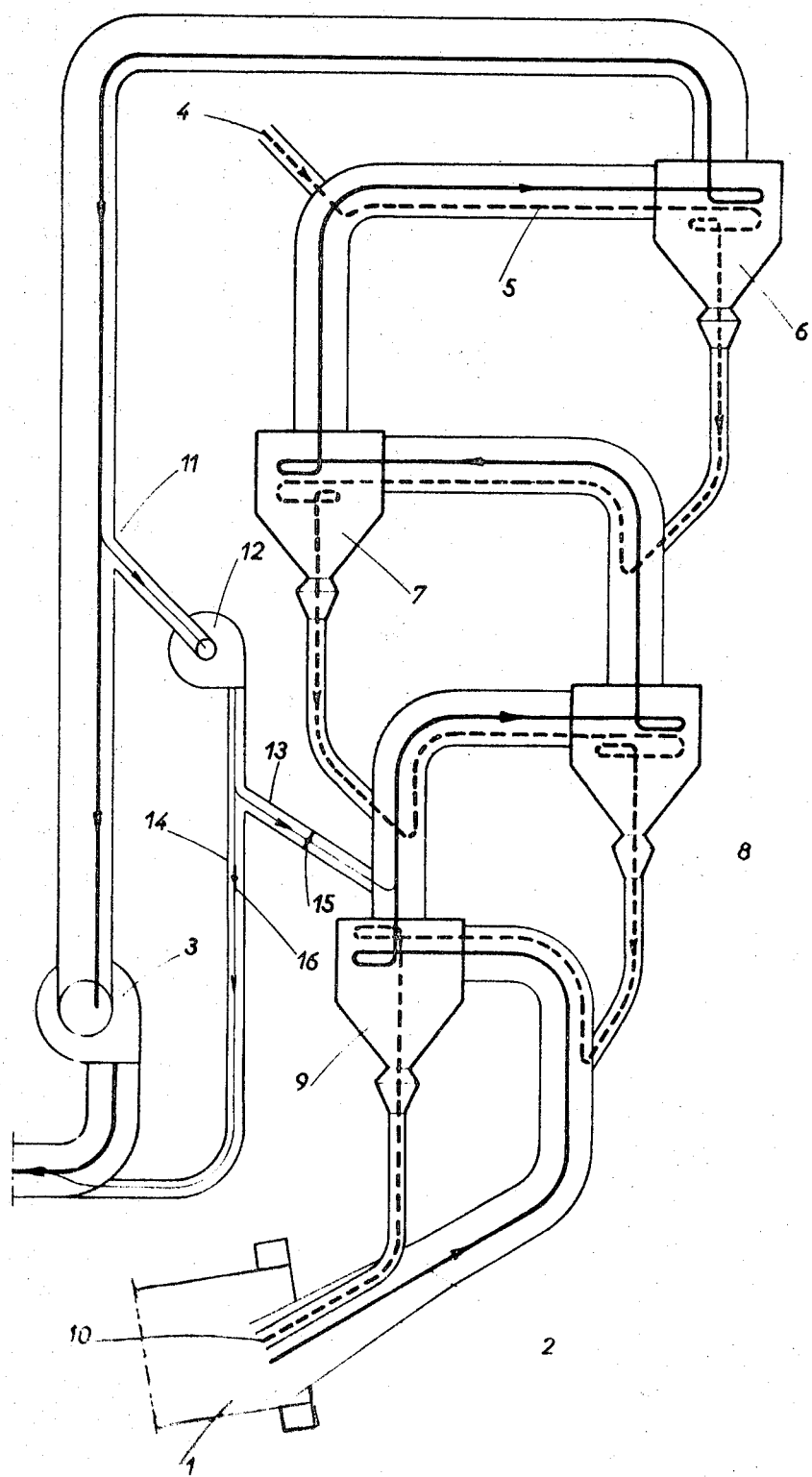

INSTALLATION FOR PREHEATING POWDERY MATERIALS BY THE EXHAUST GASES OF THE FURNACE FOR TREATING THESE MATERIALS

This invention relates to an improvement to an installation for preheating powdery materials by the exhaust gases of the furnace for treating these materials, in particular an installation for preheating the raw materials in a "dry-process" cement works.

A preheating installation of this kind comprises a succession of heaters in series, each followed by a separator of the mixture of gases and powdery materials, for example a cyclone, in which the raw powdery material and the exhaust gases of the treatment furnace, entrained in the circuit by a general blower, flow in countercurrent.

These installations are generally designed so as to produce an optimum output for a given rate of flow of powdery materials. They are not suitable for variable-flow production, because the reduction of the gaseous flow, resulting, for example, from the reduction of the flow of materials to be treated, modifies the conditions of flow of the gaseous current in the various heaters, and the materials arrive at the furnace at a temperature lower than the optimum temperature for the best output of the installation.

A first improvement is know whereby partial recycling of the gases that have passed through the set of reheaters is effected, at least one recycling circuit being produced with variable flow by a "flow-rate" blower adjustable according to the rate of flow of the powdery materials. In this case, when the flow of materials diminishes, the gaseous exhaust flow also diminishes, but the recycling flow added thereto in the heaters reestablishes the normal flow for the proper operation of these heaters and maintains normal conditions of introduction of the materials into the furnace for variable production rates. At the minimum rate of production, the recycling blower ensures its maximum rate of flow, since, as the production of materials increases, the flow rate of the general blower also increases, while the recycling flow diminishes until it ceases altogether when the production rate reaches its rated value.

If it is then desired to exceed the rated value and achieve overproduction, the recycling blower will still remain at zero flow, but the general blower will have to be operated at excess load. In practice, when it is frequently desired to operate with overproduction, a general blower is provided that has excess power, and is therefore more expensive. This blower is capable of absorbing the excess load, but it then operates under poor output conditions for the rates lower than the rated capacity of the installation.

This invention, which obviates these disadvantages, relates to a preheating installation already provided with a gaseous-recycling circuit whose rate of flow varies according to the rate of flow of materials, and ensures its operation in normal output conditions for variable rates of production both above and below the rated rate.

According to the invention, each blower of the gaseous-recycling circuit whose flow is variable according to the rate of flow of powdery materials has a two-way delivery duct, each of which is capable of absorbing the whole of the flow of the blower, one terminating upstream of the last heater through which the materials pass and the other terminating downstream of the general blower.

A specific embodiment according to the invention is shown diagrammatically in the accompanying drawing.

The single FIG. shows a treatment furnace 1 whose exhaust gasses follow a circuit 2 shown by a continuous line, entrained by a general or main blower 3.

The powdery materials are introduced at 4 and flow in countercurrent along a circuit 5 represented by broken lines, passing in succession through the cyclones 6, 7, 8 and 9 before being introduced at 10 into the furnace 1.

For the recycling circuit, part of the gaseous flow is drawn off at 11 by a variable-speed blower 12, which delivers either through the conduit 13 into the outlet duct of the gases of the cyclone 9, or through the conduit 14 downstream of the general blower 3.

A set of registers 15 and 16 is for putting one or other of the conduits 13 and 14 completely out of action.

In the case of a production rate lower than the rated production of the installation, the general blower only has to entrain a gaseous flow that is also less than its capacity, and the recycling blower 12 provides a maximum supplementary flow through the conduit 13, the register 15 being open and the register 16 closed.

If production is increased to rated value, the flow of the general blower 3 increases to the maximum of its capacity, while that of the recycling blower 12, still delivering into the conduit 13, decreases until it ceases altogether.

If it is then desired to increase production beyond the rated capacity of the installation, it becomes possible, by closing the register 15 and opening the register 16, to operate the blower 12, delivering into the conduit 14, thus making it in parallel with the blower 3. The increased gaseous flow resulting from the increase in the flow of materials can thus be absorbed by the set of blowers 3 and 12 without its being necessary to operate the blower 3 at excess load.

This use of the recycling blower 12, with recycling proper when the installation is working at underproduction and as a supplement for general blowing when the installation is working with overproduction, results in a wider range of use of the installation while preserving a uniform operational output at all rates without having to provide apparatus of excessive dimensions and high cost.

The subject of the invention is not, of course, strictly limited to the features described here by way of example, and one will not go beyond the scope of the invention if the installation differs from it in some details. It may, in particular, be provided with any other recycling circuits necessary for temperature regulation or any means for control between recycling circuits, and may even comprise several systems similar to the one described and relating to different recycling circuits.

We claim:

1. An improvement to an installation for preheating powdery materials by the exhaust gases of the furnace for treating these materials, the gases being entrained by a main blower, the materials and gases flowing in countercurrent through a plurality of heaters in series, each followed by a separator of the mixture of gases and powdery materials, part of the preheating gases, having passed through the heaters and having been withdrawn upstream of the main blower, supplies a circuit for recycling these gases and at at least one point of reintroduction into the preheating circuit, said point of reintroduction has a flow that is adjustable according to the flow of powdery materials and is situated upstream of the last heater through which the materials pass, the improvement of providing at least one recycling blower in the recycling circuit, said recycling blower of the gaseous-recycling circuit having a rate of flow variable according to the flow of powdery material and being provided with a two-way delivery duct, each way of said duct being capable of taking the whole of the flow of said recycling blower, one of said ways terminating upstream of the last heater through which the materials pass and the other of said ways terminating downstream of the main blower.

2 An improvement to a preheating installation as claimed in claim 1, the two delivery ways of said recycling blower having registers so connected that one is opened when the other is closed.